United States Patent [19]

Werner

[11] 4,384,355
[45] May 17, 1983

[54] CONTROL OF COEFFICIENT DRIFT FOR FRACTIONALLY SPACED EQUALIZERS

[75] Inventor: Jean-Jacques Werner, Holmdel, N.J.

[73] Assignee: Bell Telephone Laboratories, Incorporated, Murray Hill, N.J.

[21] Appl. No.: 213,463

[22] Filed: Dec. 5, 1980

Related U.S. Application Data

[63] Continuation of Ser. No. 84,857, Oct. 15, 1979, abandoned.

[51] Int. Cl.³ ............................................. H04B 1/10
[52] U.S. Cl. ........................................ 375/14; 333/18
[58] Field of Search ................... 375/11, 14; 328/168; 329/168, 170; 333/18, 28 R

[56] References Cited

U.S. PATENT DOCUMENTS

| | | | |
|---|---|---|---|
| 3,974,449 | 8/1976 | Falconer | 375/14 |
| 4,021,738 | 5/1977 | Gitlin et al. | 375/14 |
| 4,100,604 | 7/1978 | Perreault | 333/18 |
| 4,158,232 | 6/1979 | Koeth et al. | 375/14 |
| 4,181,888 | 1/1980 | Falconer | 333/18 |
| 4,184,129 | 1/1980 | Danjon et al. | 333/18 |
| 4,247,940 | 1/1981 | Mueller et al. | 375/14 |

OTHER PUBLICATIONS

"Fractional Tap-Spacing Equalizers and Consequences for Clock Recovery for Data Modems," G. Ungerboeck, *IEEE Transaction on Communications*, vol. COM-24, No. 8, Aug. 1976, pp. 856-864.

*Primary Examiner*—Donald J. Yusko
*Attorney, Agent, or Firm*—Ronald D. Slusky

[57] ABSTRACT

Tap coefficient drift in a fractionally spaced equalizer (10) is minimized by adding signal energy (n(t)) to the received data signal ($s_r(t)$) at frequencies where the sampled channel transfer function has substantially zero gain.

42 Claims, 13 Drawing Figures

CONTROL OF COEFFICIENT DRIFT FOR FRACTIONALLY SPACED EQUALIZERS

RELATED APPLICATION

This is a continuation of U.S. patent application Ser. No. 84,857, filed Oct. 15, 1979, abandoned.

BACKGROUND OF THE INVENTION

The present invention relates to automatic equalizers which compensate for the distorting effects of band-limited channels on transmitted data signals.

Automatic equalizers are necessary for accurate reception of high-speed data signals transmitted over band-limited channels with unknown transmission characteristics. The equalizer is generally in the form of a transversal filter in which a sampled signal comprised of samples of the incoming data signal are multiplied by respective tap coefficients. The resulting products are added together to generate an equalizer output which is then demodulated and/or quantized to recover the transmitted data. In addition, an error signal is formed equal to the difference between the equalizer output and a reference signal which represents the transmitted data symbol. The value of the symbol that was transmitted may be known at the receiver a priori, as is the case in many equalizer start-up arrangements. Alternatively, as in the so-called adaptive type of automatic equalizer, the reference signal is derived from the decision made in the receiver (on the basis of the equalized signal value) as to what data symbol was transmitted. In either case, the error signal is used to update the tap coefficient values in such a way as to minimize a measure of the distortion—primarily intersymbol interferences—introduced by the channel. The most commonly used error-directed coefficient updating algorithm is the so-called mean-squared error algorithm, which adjusts the tap coefficients so as to minimize the average of the value of the square of the error signal.

Most commercial data receivers, e.g., data modems, incorporate a synchronous, or baud, equalizer in which the received data signal is sampled at a rate equal to the symbol rate. It is, however, possible to use a so-called fractionally spaced equalizer in which the received signal is sampled at a higher rate. Data decisions, i.e., quantizations of the equalizer outputs, are still made at the symbol rate. However, the fact that equalization is carried out using a finer sampling interval provides the fractionally spaced equalizer with significant advantages over its more conventional cousin. Most notable among these is insensitivity to channel delay distortion, including sampling phase errors.

There is, however, at least one significant problem unique to the fractionally spaced equalizer. In a synchronous equalizer, one set of tap coefficients is clearly optimum, i.e., provides the smallest mean-squared error. By contrast, many sets of coefficient values provide approximately the same mean-squared error in the fractionally spaced equalizer. As a consequence of this property, the presence of small biases in the coefficient updating processing hardware—such as biases associated with signal value roundoff—can cause at least some of the coefficient values to drift to very large levels, or "blow up," even though the mean-squared error remains at, or close to, its minimum value. The registers used to store the coefficients or other signals generated during normal equalizer operation can then overflow, causing severe degradation, or total collapse, of the system response.

The prior art—exemplified by G. Ungerboeck, "Fractional Tap-Spacing Equalizers and Consequences for Clock Recovery for Data Modems," *IEEE Trans. on Communications*, Vol. COM-24, No. 8, August 1976, pp. 856–864—suggests that the coefficient drift can be controlled by introducing one of two alternative auxiliary terms into the conventional updating algorithm. The auxiliary term may be, for example, a predetermined small fraction of the current value of the coefficient being updated. This implements a so-called tap leakage approach. Alternatively, a spectral zero-forcing approach is suggested. Here, the auxiliary term is a predetermined small fraction of an alternating-sign sum of the current values of all coefficients.

These approaches, while providing an upper limit for the coefficient values, are not wholly satisfactory from other standpoints. For example, it is desirable in any transversal filter type of automatic equalizer to have as many of the coefficient values at or as close to zero as possible. This means that the numerical computations associated with coefficient updating will involve the manipulation and storage of smaller numbers than would otherwise be the case. This, in turn, minimizes the complexity and expense of the computational hardware. In addition, keeping as many of the coefficient values at or as close to zero as possible best conditions the system to withstand the effects of, and to recover from, phase hits and other transmission disturbances. The above-described approaches for dealing with coefficient drift, while providing an upper limit for the coefficient values, allow a large number of the coefficients to assume values which are not at or close to zero. Thus, system performance suffers.

A more efficacious technique for controlling coefficient drift is taught in the copending, commonly assigned U.S. patent application of R. D. Gitlin et al, Ser. No. 16,495, filed Mar. 1, 1979, now U.S. Pat. No. 4,237,554 issued Dec. 2, 1980. As in Ungerboeck, a tap leakage term is introduced into the coefficient updating algorithm. Here, however, the magnitude of the tap leakage term is independent of any coefficient value; it is illustratively a constant. This approach has been found to substantially avoid the above-outlined drawbacks of the Ungerboeck approach.

On the other hand, the Gitlin et al tap leakage (like Ungerboeck) necessarily introduces a certain amount of noise into the equalization process inasmuch as it changes the coefficients from the values which the error-directed algorithm specifies. This has not been found to be a significant effect in, for example, the so-called T/2 equalizer which receives two line samples per symbol interval. However, T/p equalizers, p>2, tend to exhibit greater tendency toward tap coefficient drifting. This necessitates increasing the magnitude of the tap leakage term, introducing further noise in the equalization process and thereby increasing the likelihood of an incorrect data decision.

SUMMARY OF THE INVENTION

The principal object of the present invention, then, is to provide a technique for controlling coefficient drift in fractionally spaced equalizers which is effective to that end but which at the same time minimally affects the accuracy of the equalization process itself.

In accordance with the invention, the sampled signal applied to the equalizer is provided with added energy at frequencies at which the sampled channel transfer function has substantially zero gain. This forces the equalizer to have a unique transfer function and, thus, a unique set of coefficient values for the channel being equalized. The coefficient drift problem is thus substantially eliminated.

The added energy may be in any of numerous forms. However, in preferred embodiments of the invention, it is in the form of one or more sweeping sinusoids.

BRIEF DESCRIPTION OF THE DRAWING

The invention may be clearly understood from a consideration of the following detailed description and accompanying drawing in which.

DETAILED DESCRIPTION

Figure 1:
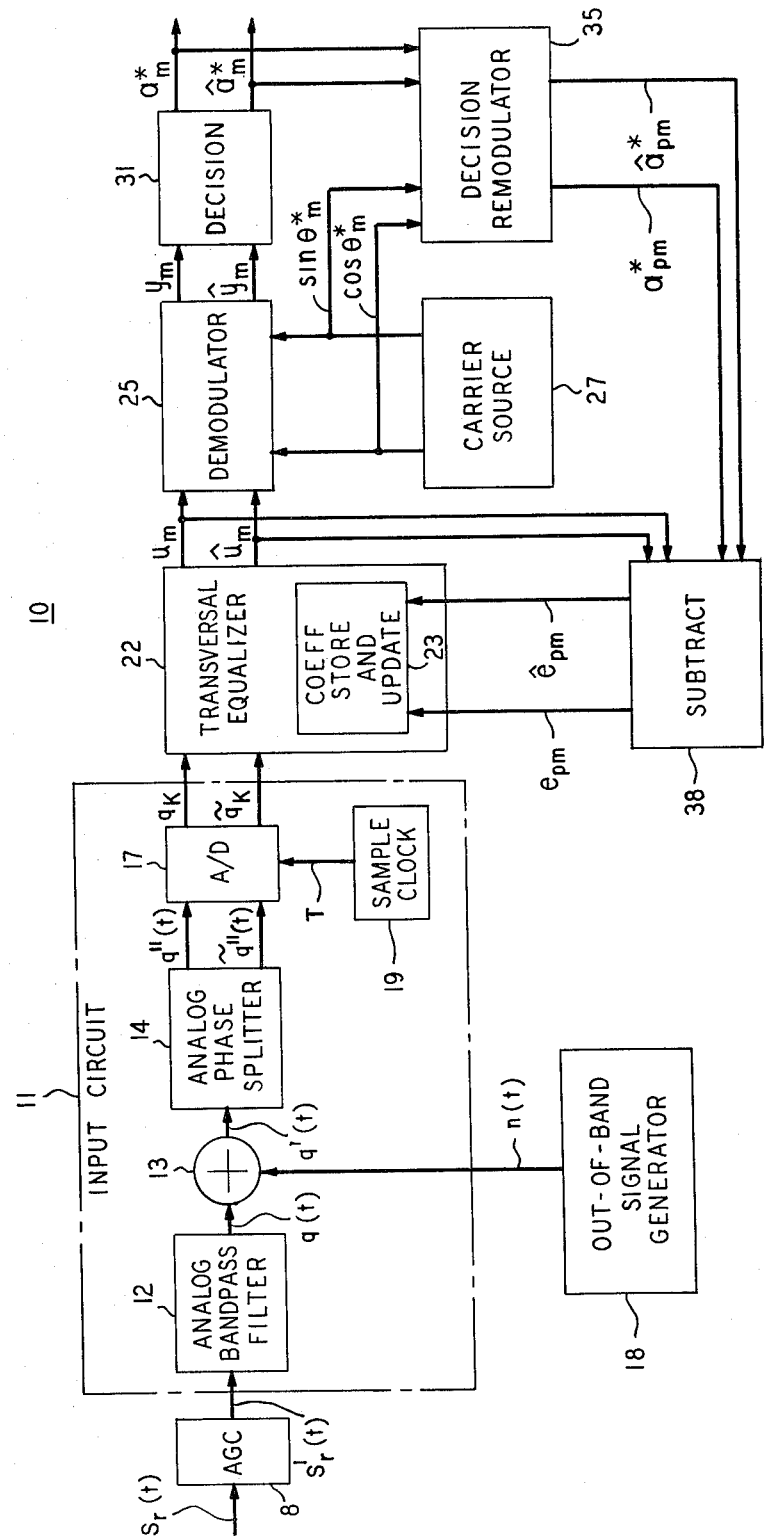
FIG. 1 is a block diagram of a data receiver including circuitry embodying the principles of the invention.

FIG. 1 depicts a receiver 10 for data signals transmitted from a transmitter (not shown) over a bandlimited channel, e.g., voiceband telephone circuit. The data signals are illustratively quadrature amplitude modulated (QAM) data signals wherein four paralleled information bits are transmitted during each of a succession of symbol intervals of duration T. The symbol rate is thus 1/T, yielding a binary transmission rate of 4/T bits per second. During each symbol interval, the four bits to be transmitted are encoded into two signal levels each of which can take on one of the four values [+1, −1, +3, −3]. The two signal levels transmitted during the $m^{th}$ symbol interval comprise data symbol $A_m$—a complex quantity having real and imaginary components $a_m$ and $\hat{a}_m$, respectively. Components $a_m$ and $\hat{a}_m$, in turn, amplitude modulate respective 1800 Hz inphase and quadrature-phase carrier waves. The modulated signals, when added together, form a QAM signal $s(t)$ of the form $$s(t) = Re\left[\sum_m A_m g(t - mT)e^{j\omega_c t}\right]$$

where g(t) is a real function and $\omega_c$ is the radian carrier frequency. Signal s(t) is then transmitted to receiver 10.

In receiver 10, the received QAM signal $s_r(t)$ passes through automatic gain control circuit 8 where it emerges as signal $s_r'(t)$. The latter is applied to an input circuit 11 and, more particularly, to analog bandpass filter 12 thereof. The function of filter 12 is to filter out any energy in signal $s_r'(t)$ outside of the transmission band of interest—in this example the band 300–3000 Hz. In accordance with the present invention, the output signal q(t) of filter 12 is added in an adder 13 to a signal n(t) generated by out-of-band signal generator 18. Signal n(t) is discussed in more detail hereinbelow.

Input circuit 11 further includes a phase splitter 14, a sampler in the form of an analog-to-digital (a/d) converter 17 and sample clock 19. Phase splitter 14 responds to the output signal q'(t) of adder 13 to generate two versions of signal q'(t). One of these is q''(t), which may be identical to q'(t) or may be a phase-shifted version of it. The other, represented as $\bar{q}''(t)$, is the Hilbert transform of q''(t). Signals q''(t) and $\bar{q}''(t)$ may be regarded as the real and imaginary components of a complex signal Q''(t).

Signals q''(t) and $\bar{q}''(t)$ are passed to a/d converter 17. The latter is operated by clock 19 p times per symbol interval to generate a sampled signal in the form of equalizer input samples $q_k$ and $\bar{q}_k$, k=1,2 ... of signals q''(t) and $\bar{q}''(t)$. Equalizer input samples $q_k$ and $\bar{q}_k$ may be thought of as components of a complex equalizer input sample $Q_k$.

Equalizer input sample components $q_k$ and $\bar{q}_k$ pass on to transversal filter equalizer 22. The latter generates an output once every T seconds. In particular, the output of equalizer 22 during the $m^{th}$ receiver symbol interval of duration T is complex passband equalizer output $U_m$ having components $u_m$ and $\hat{u}_m$. Equalizer 22 generates its outputs by forming linear combinations of the equalizer input sample components in accordance with the relations $$u_m = c_m^T r_m + d_m^T \hat{r}_m$$

$$\hat{u}_m = c_m^T \hat{r}_m - d_m^T r_m$$

In these expressions $r_m$ and $\hat{r}_m$ are (N×1) matrices, or vectors, respectively comprised of the N most recent real and imaginary equalizer input sample components, N being a selected integer. That is $$r_m = \begin{pmatrix} q_k \\ q_{k-1} \\ \vdots \\ q_{k-(N-1)} \end{pmatrix} \text{ and } \hat{r}_m = \begin{pmatrix} \hat{q}_k \\ \hat{q}_{k-1} \\ \vdots \\ \hat{q}_{k-(N-1)} \end{pmatrix}.$$

In addition, $c_m$ and $d_m$ are (N×1) vectors each comprised of an ensemble of N tap coefficients having values associated with the $m^{th}$ receiver interval. (The superscript "T" used in the above expressions indicates the matrix transpose operation wherein the (N×1) vectors $c_m$ and $d_m$ are transposed into (1×N) vectors for purposes of matrix multiplication.) The values of the coefficients in these vectors are determined in the manner described below. Vectors $c_m$ and $d_m$ may be thought of as the real and imaginary components of a complex coefficient vector $C_m$.

Passband equalizer output $U_m$ is demodulated by demodulator 25 to yield baseband output $Y_m$. The latter and passband equalizer output $U_m$ respectively represent baseband and passband versions of transmitted symbol $A_m$. Baseband output $Y_m$ has real and imaginary components $y_m$ and $\hat{y}_m$, the demodulation process being expressed as $$y_m = u_m \cos \theta_m^* + \hat{u}_m \sin \theta_m^*$$

$$\hat{y}_m = -u_m \sin \theta_m^* + \hat{u}_m \cos \theta_m^*,$$

$\theta_m^*$ being an estimate of the current carrier phase. For purposes of generating $y_m$ and $\hat{y}_m$ in accordance with the above expressions, demodulator 25 receives representations of $\cos \theta_m^*$ and $\sin \theta_m^*$ from a carrier source 27.

Baseband output $Y_m$ is quantized in decision circuit 31. The resulting output $A_m^*$ is a decision as to the value of the transmitted symbol $A_m$. In particular, the real and imaginary parts of $A_m^*$, $a_m^*$ and $\hat{a}_m^*$, are decisions as to the data signal values represented by the real and imaginary components $a_m$ and $\hat{a}_m$ of transmitted symbol $A_m$. Decision circuit 31, more particularly, forms decision $a_m^*(\hat{a}_m^*)$ by identifying the one of the four possible data signal values $[+1, -1, +3, -3]$ which is closest to the value of baseband output component $y_m(\hat{y}_m)$.

Decision $A_m^*$ is also used to generate an error signal for use in updating coefficient vectors $c_m$ and $d_m$. In particular, decision components $a_m^*$ and $\hat{a}_m^*$ are combined in decision remodulator 35 with $\sin \theta_m^*$ and $\cos \theta_m^*$ from carrier source 27 to form remodulated, or passband, decision $A_{pm}^*$. The real and imaginary components of $A_{pm}^*$, $a_{pm}^*$ and $\hat{a}_{pm}^*$, are formed in accordance with $$a_{pm}^* = a_m^* \cos \theta_m^* - \hat{a}_m^* \sin \theta_m^*$$

$$\hat{a}_{pm}^* = a_m^* \sin \theta_m^* + \hat{a}_m^* \cos \theta_m^*.$$

Passband decision $A_{pm}^*$ is subtracted from passband equalizer output $U_m$ in subtractor 38 to yield passband error $E_{pm}$ having components $e_{pm}$ and $\hat{e}_{pm}$ given by $$e_{pm} = u_m - a_{pm}^*$$

$$\hat{e}_{pm} = \hat{u}_m - \hat{a}_{pm}^*.$$

Error signal components $e_{pm}$ and $\hat{e}_{pm}$ are extended to coefficient store and update unit 23 within equalizer 22 for purposes of updating the values of the coefficients in coefficient vectors $c_m$ and $d_m$ in preparation for the next, $(m+1)^{st}$, symbol interval. The so-called mean-squared error stochastic updating algorithm is illustratively used, yielding the updating rules $$c_{m+1} = c_m - \alpha[r_m e_{pm} + \hat{r}_m \hat{e}_{pm}]$$

$$d_{m+1} = d_m - \alpha[\hat{r}_m e_{pm} - r_m \hat{e}_{pm}],$$

$\alpha$ being a predetermined constant. These rules can be written in complex notation as $$C_{m+1} = C_m - \alpha R_k E_{pm}.$$

Figure 2:
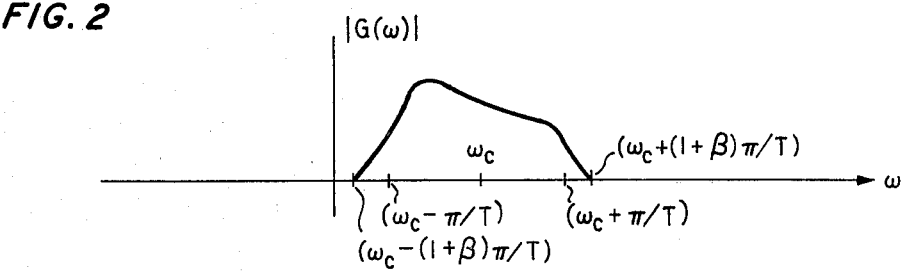
FIGS. 2-5 are signal amplitude vs. frequency plots helpful in explaining the operation of baud-sampled equalizers.

The problem to which the present invention is directed is illustrated in FIGS. 2–10. FIG. 2, in particular, shows the positive frequency portion of the magnitude $|G(\omega)|$ of the transfer function of a typical voiceband telephone transmission channel. In this discussion, the "transmission channel" is assumed to include the transmitter, the transmission medium and all receiver circuitry through and including the receiver phase splitter. The negative frequency portion of $|G(\omega)|$ need not be considered since the complex signal $Q''(t)$ at the output of phase splitter 14 is "analytic," i.e., has no negative frequencies. The radian carrier frequency of the QAM signal to be transmitted is $\omega_c$. The transmission channel extends from $(\omega_c - (1+\beta)\pi/T)$ to $(\omega_c + (1+\beta)\pi/T)$ rad/sec, meaning that within that band the gain provided by the channel is at least some predetermined minimum, e.g., $-40$ db. Outside of that band, the gain is less than that minimum and is presumed to be zero. The parameter $\beta$ is the so-called percent roll-off and has a value between zero and unity given by $$\beta = (\omega_{co}T/\pi - 1)$$

where the frequency $(\omega_c + \omega_{co})$ is the upper frequency limit of the transmission channel.

The transfer function $G_s(\omega)$ of the "sampled channel," defined as the combination of the transmission channel with all receiver circuitry up through and including the sampler, i.e., a/d converter 17, is arrived at by a "folding" operation to yield $$G_s(\omega) = \sum_{n=-\infty}^{\infty} G(\omega - 2\pi np/T).$$

It is thus seen that the sampled channel transfer function is a superposition in the frequency domain of repetitions of the unsampled transfer function translated in frequency by multiples of $2\pi p/T$.

Figure 3:
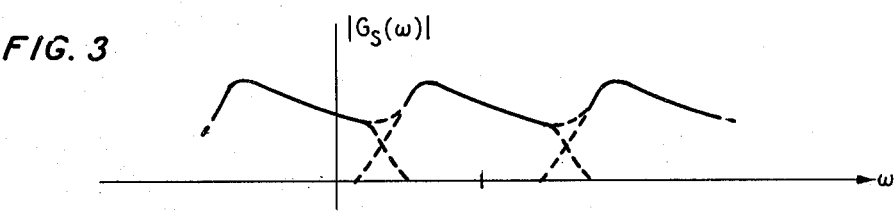
Figure 4:
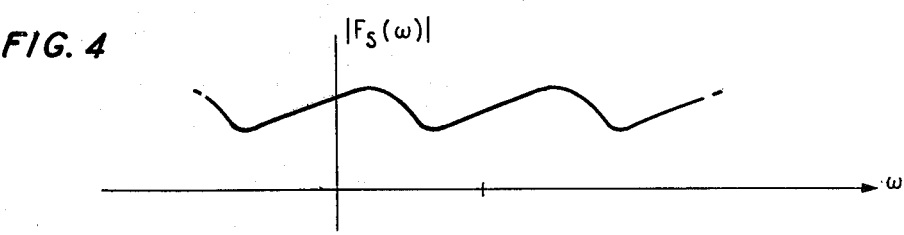
Figure 5:
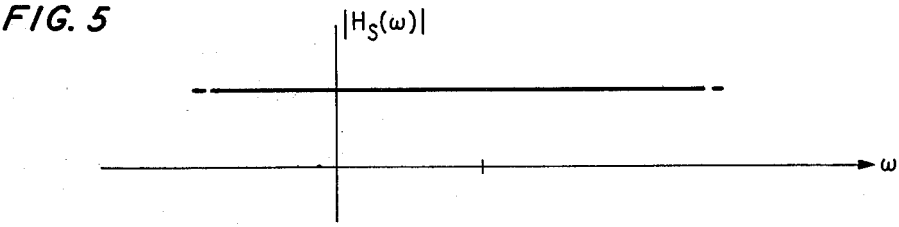

For baud equalization, of course, $p=1$. As shown in FIG. 3, $|G_s(\omega)|$ for this case is non-zero for all $\omega$ because the tails (shown in dotted line) of each translated $G(\omega)$ overlap and add with those of adjacent translated $G(\omega)$'s. A baud equalizer is properly equalized when the equalized channel transfer function, i.e., the overall transfer function of the sampled channel-plus-equalizer combination, has constant gain (and linear phase characteristic) at all frequencies. The magnitude $|H_s(\omega)|$ of an ideal such transfer function for a baud-sampled receiver is shown in FIG. 5. Thus, for any given channel, there is a unique, optimum equalizer transfer function—corresponding to a unique ensemble of tap coefficient values—which provides the best equalization, i.e., the smallest mean-squared error for baud sampling. The magnitude $|F_s(\omega)|$ of that optimum equalizer transfer function for the channel under consideration is shown in FIG. 4.

Figure 6:
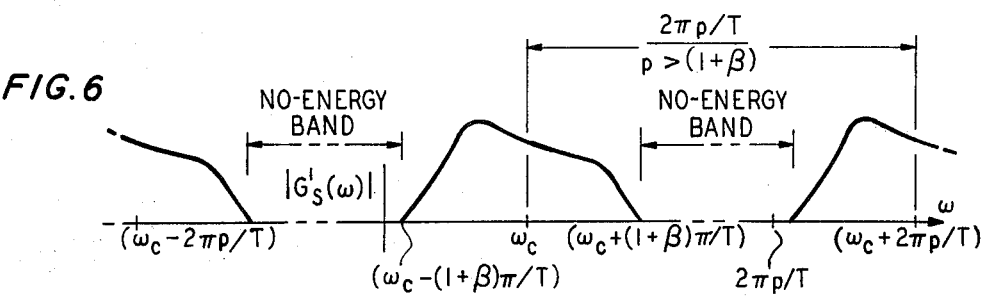
FIGS. 6-10 are signal amplitude vs. frequency plots helpful in explaining the operation of fractionally spaced equalizers and, in particular, the coefficient drift phenomenon.

For fractionally spaced equalization, by contrast, $P > (1+\beta)$ so that the tails of adjacent repetitions of $|G(\omega)|$ do not overlap. They are, rather, separated by what may be referred to as "no-energy bands." This is illustrated in FIG. 6 which shows the transfer function magnitude $|G_s'(\omega)|$ of $G(\omega)$ sampled at p/T samples per second, $p > (1+\beta)$.

Figure 7:
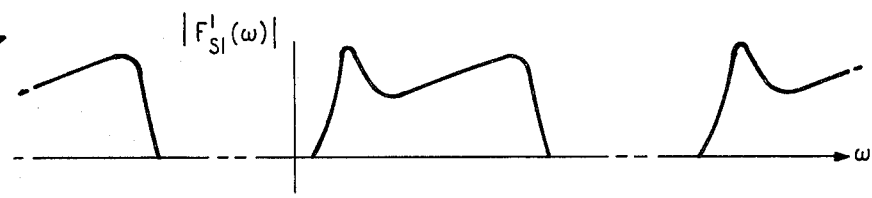
Figure 8:
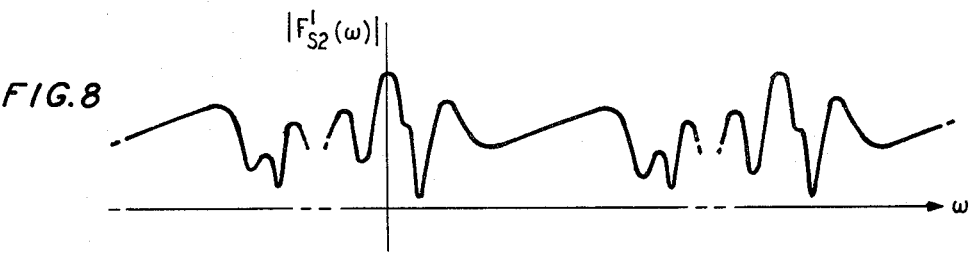
Figure 9:
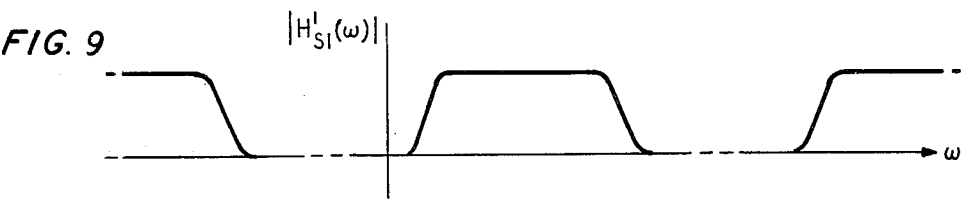
Figure 10:
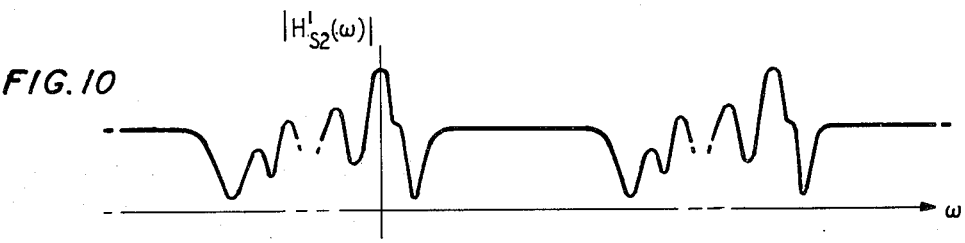

A consequence of the nonoverlapping of the repetitions of $G(\omega)$ is that a number of fractionally spaced equalizer transfer functions—each corresponding to a different coefficient ensemble—provide substantially the same, minimum mean-squared error. The magnitudes of two such equalizer transfer functions $|F_{s1}'(\omega)|$ and $|F_{s2}'(\omega)|$ are shown in FIGS. 7 and 8, respectively. The magnitudes $|H_{s1}'(\omega)|$ and $|H_{s2}'(\omega)|$ of the resulting equalized channel transfer functions are shown in FIGS. 9 and 10. From the standpoint of minimizing the mean-squared error, the equalizer transfer functions of FIGS. 7 and 8 are equivalent; since there is no signal energy in the no-energy bands, the fact that $|H_{s2}'(\omega)|$ is non-zero in these bands is irrelevant—at least in theory.

There is a problem, however. The fact that there is no unique optimum equalizer transfer function means that as the tap coefficient values are updated over time, small biases in the coefficient updating processing hardware—such as biases associated with signal value round-off—can cause at least some of the coefficient values to drift. This corresponds to a drift in the equalizer transfer function. For example, the transfer function of FIG. 7 may obtain right after equalizer start-up, but may drift to that of FIG. 8 after, say, five minutes. Ultimately, some of the coefficient values may drift to such large levels that the registers used to store the coefficients or other signals generated during normal equalizer operation can then overflow, causing severe degradation, or total collapse, of the system response.

Unlike the tap leakage arrangements, which represent time domain approaches to the coefficient drift problem, the present invention fights the coefficient drift in the frequency domain. In accordance with the present invention, the sampled signal is provided with added energy in the no-energy bands. That is, the added energy is at frequencies at which the sampled channel transfer function has substantially zero gain.

The presence of the added energy in the no-energy bands means that if the coefficient values now start to drift, causing the gain of the equalizer transfer function to increase in the no-energy bands, the contribution of the added energy to the mean-squared error will be non-negligible. The coefficient updating algorithm responds by adjusting the coefficients so as to minimize the error. In so doing, it forces the equalizer to have a unique transfer function—one which, like the transfer function of FIG. 7, has substantially zero gain in the no-energy bands. Since a unique transfer function implies a unique set of coefficient values, the coefficient drift problem is substantially eliminated.

Providing the sampled signal with the added energy may be accomplished by introducing a signal in digital form at the output of the a/d converter. Alternatively, as in the present illustrative embodiment, the signal may be introduced in analog form ahead of the a/d converter. In the latter case, the signal need have energy only in the no-energy bands within the range $(0-2\pi p/T)$ rad/sec, i.e., at frequencies at which the transfer function of the transmission channel has substantially zero gain. This is because the folding which occurs upon sampling results in energy being added to the sampled signal in each no-energy band of the sampled channel transfer function, as desired, not just within the range $(0-2\pi p/T)$. In a system in which the sampler input is an analytic signal, as in the present illustrative embodiment, energy is added in at least one of the frequency bands (0 to $(\omega_c-(1+\beta)\pi/T))$ and $((\omega_c+(1+\beta)\pi/T)$ to $2\pi p/T)$ rad/sec. Where the sampler input is not analytic, but is real, energy is added in at least one of the frequency bands (0 to $(\omega_c-(1+\beta)\pi/T))$ and $((\omega_c+(1+\beta)\pi/T)$ to $\pi p/T)$ rad/sec.

In receiver 10, in particular, the above-discussed added signal energy, denominated n(t), is illustratively provided in analog form from out-of-band signal generator 18. Signal n(t) is added to signal q(t) via adder 13 to generate signal q'(t).

The amplitude of signal n(t) should be sufficiently large to provide the necessary amount of coefficient drift control. An amplitude of 10–15 db below the amplitude of the AGC output signal has been found to be appropriate.

Figure 11:
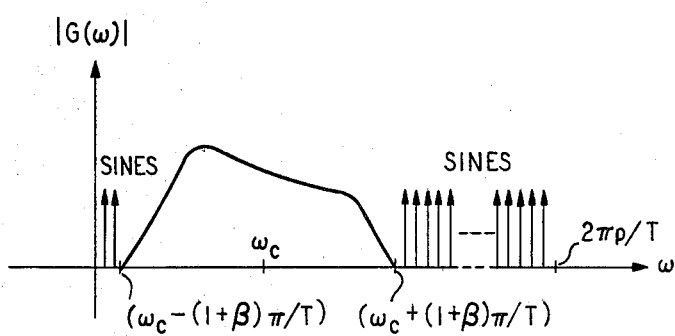
FIGS. 11-13 are signal amplitude vs. frequency plots depicting several forms for the sampled signal added energy.

The spectrum of signal n(t) may take any of several forms. For example, as shown in FIG. 11, signal n(t) may be comprised of a sum of sinusoids, each having a selected frequency. The frequency gap between adjacent sinusoids should be fairly small. Otherwise, the equalizer will generate zeros on the frequency axis where the sinusoids are located, but it will be unable to compensate for the build-up of gain between the zeros. In an actual embodiment of the invention having $\omega_c = 2\pi 1800$, p=6, and T=1/1600, a spacing of 150 Hz between adjacent sinusoids was found to be adequate.

Figure 12:
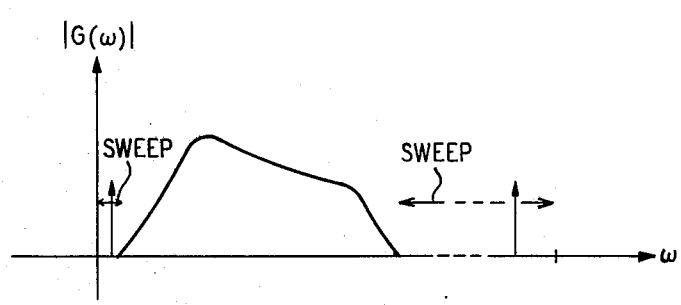

Alternatively, as shown in FIG. 12, signal n(t) may be comprised of one or more sweeping sinusoids, i.e., sinusoids whose frequencies are varied in a predetermined manner. In many applications this will be the preferable alternative, it being the simplest to implement. With $\omega_c$, p and T having the values indicated above, a sweeping frequency of 10 Hz was found to be effective.

Figure 13:
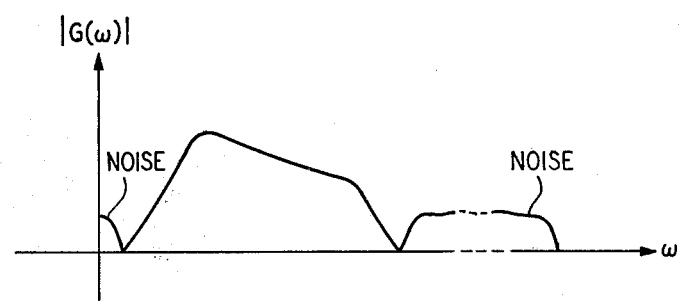

Alternatively, signal n(t) may be comprised of random noise as shown in FIG. 13. In this case, however, special care must be taken to ensure that the sum of the AGC output and n(t) does not exceed the dynamic range of the subsequent circuitry.

As mentioned above, the additive signal of the present invention may be introduced in digital form at the a/d converter output. In this regard, it should be noted that if the radian frequency $2\pi p/T$ happens to fall within a no-energy band, a sinusoid of amplitude A can be introduced at that frequency by adding the quantity A to the real component $q_k$ of each equalizer input sample.

The foregoing merely illustrates the principles of the present invention. For example, in some applications coefficient drift may be satisfactorily eliminated without adding energy in narrow no-energy bands, e.g., the band (0 to $(\omega_c-(1+\beta)\pi/T))$.

It will thus be appreciated that numerous arrangements embodying the principles of the invention may be devised by those skilled in the art without departing from their spirit and scope.

What is claimed is:

1. Apparatus for processing a received data signal transmitted to said apparatus over a band-limited transmission channel, said received data signal representing a succession of data signal values occurring at T second intervals, said apparatus comprising
    means for forming a sampled signal comprised of a succession of samples occurring at a predetermined rate of p/T samples per second, p>1, said sampled signal including energy derived from said received data signal distributed in a first plurality of frequency bands and further including additional energy distributed at frequencies intermediate said frequency bands,
    means for equalizing said sampled signal,
    means for recovering said data signal values from the output of said equalizing means, and
    means for repetitively updating the response of said equalizing means.

2. The invention of claim 1 wherein said data signal has a percent rolloff $\beta$ and wherein p>$(1+\beta)$.

3. Apparatus for processing a received signal transmitted with a percent rolloff $\beta$ to said apparatus over a band-limited transmission channel, said received signal representing a succession of data symbols occurring at T second intervals, said apparatus comprising
    means for forming a sampled signal comprised of a succession of samples occurring at a predetermined rate of p/T samples per second, p>$(1+\beta)$, said sampled signal including energy derived from said received signal distributed in a first plurality of frequency bands and further including additional energy distributed at frequencies intermediate said frequency bands,
    means operative during successive T second intervals for forming respective equalizer outputs each equal to the sum of the products of a plurality of coefficients with a plurality of said samples, means responsive to at least ones of the equalizer outputs for forming decisions as to respective ones of the data symbols and for forming corresponding error signals, and means for updating the values of said coefficients in response to at least ones of said error signals.

4. The invention of claims 1, 2 or 3 wherein said additional energy is comprised of a plurality of sinusoids, each having a selected frequency.

5. The invention of claims 1, 2 or 3 wherein said additional energy is comprised of at least one sinusoid, the frequency of which is varied in a predetermined manner.

6. The invention of claims 1, 2 or 3 wherein said additional energy is comprised of noise energy.

7. The invention of claim 3 wherein said updating means is comprised of means for updating the values of said coefficients in such a way as to minimize the average of the value of the squares of said ones of said error signals.

8. Apparatus for use in a receiver which receives a passband signal transmitted to said receiver with a percent rolloff $\beta$ over a band-limited transmission channel, said received passband signal representing a succession of data signal values occurring at T second intervals, said apparatus comprising means for forming a sampled signal comprised of a succession of samples occurring at a predetermined rate of p/T samples per second, $p>(1+\beta)$, said sampled signal including energy derived from said received passband signal distributed in a first plurality of frequency bands and further including additional energy distributed at frequencies intermediate said frequency bands, and signal processing means operative during each one of a succession of T second intervals for forming a decision as to an individual one of said data signal values, said signal processing means comprising equalizer means for multiplying at least individual ones of a predetermined number of the most recently formed ones of said samples with individual ones of a plurality of coefficients, each coefficient having a predetermined value associated with said one of said intervals, means for demodulating the sum of the resulting products to form a baseband output, and means responsive to said baseband output for forming said decision and for forming a passband error signal, said passband error signal being equal to the difference between said sum and a remodulated version of said decision, said equalizer means including means for determining in response to said passband error signal the value of said each coefficient associated with a subsequent one of said intervals.

9. The invention of claim 8 wherein said sampled signal forming means is comprised of means for combining with said received passband signal a signal having energy within the range (0–2$\pi$p/T) rad/sec at frequencies at which the transfer function of said transmission channel has substantially zero gain and means for sampling the output of said combining means at said predetermined rate.

10. The invention of claim 8 wherein said received passband signal has a radian carrier frequency $\omega_c$ and wherein $\beta = (\omega_{co}T/\pi - 1)$, $(\omega_c + \omega_{co})$ being the highest frequency at which the transfer function of said transmission channel has substantially zero gain.

11. The invention of claims 8, 9 or 10 wherein said additional energy is comprised of a plurality of sinusoids each having a selected frequency.

12. The invention of claims 8, 9 or 10 wherein said additional energy is comprised of at least one sinusoid, the frequency of which is varied in a predetermined manner.

13. The invention of claims 8, 9 or 10 wherein said additional energy is comprised of random noise energy.

14. The invention of claim 10 wherein said determining means includes means for combining an updating term with the value of said each coefficient associated with said one of said intervals, the magnitude of said updating term being equal to a predetermined fraction of the product of a passband error signal formed during a predetermined one of said intervals with the sample with which said one coefficient was multiplied during said predetermined one of said intervals.

15. An arrangement for processing a received data signal transmitted with a percent rolloff $\beta$ to said arrangement over a band-limited transmission channel at 1/T symbols per second, said arrangement comprising means for combining a second signal with said received signal to generate a combined signal, means for forming samples of said combined signal at a rate of p/T samples per second, $p>(1+\beta)$, said second signal having energy within the range (0–2$\pi$p/T) rad/sec at frequencies at which the transfer function of said transmission channel has substantially zero gain, means for equalizing said samples, means for forming decisions as to the values of said symbols in response to the equalized samples, and means for repetitively updating the response of said equalizing means.

16. An arrangement for processing a received data signal transmitted with a percent rolloff $\beta$, to said arrangement over a band-limited transmission channel at 1/T symbols per second, said arrangement comprising means for combining a second signal with said received signal to generate a combined signal, means responsive to said combined signal for forming a sampled signal at a rate of p/T samples per second, $p>(1+\beta)$, said second signal having energy within the range (0–2$\pi$p/T) rad/sec at frequencies at which the transfer function of said transmission channel has substantially zero gain, means operative during successive T second intervals for forming respective equalizer outputs each equal to the sum of the products of a plurality of coefficients with respective ones of a plurality of said samples, means responsive to at least ones of the equalizer outputs for forming decisions as to the values of respective ones of the transmitted symbols and for forming corresponding error signals, and means for updating the values of said coefficients in response to at least ones of said error signals.

17. The invention of claims 15 or 16 wherein said second signal is comprised of a plurality of sinusoids, each having a selected frequency.

18. The invention of claims 15 or 16 wherein said second signal is comprised of at least one sinusoid, the frequency of which is varied in a predetermined manner.

19. The invention of claims 15 or 16 wherein said second signal is a noise signal.

20. The invention of claims 15 or 16 wherein said data signal is a passband signal having a radian carrier frequency $\omega_c$ and wherein the highest frequency at which the transfer function of said transmission channel has substantially non-zero gain is $(\omega_c + (1+\beta)\pi/T)$.

21. The invention of claim 16 wherein said updating means is comprised of means for updating each of said coefficients in such a way as to minimize the average of the value of the squares of said error signals.

22. A method for processing a data signal received over a band-limited transmission channel, said received data signal representing a succession of data symbols occurring at T second intervals, said method comprising the steps of
forming a sampled signal comprised of a succession of samples occurring at a predetermined rate of p/T samples per second, $p > 1$, said sampled signal including energy derived from said received data signal distributed in a first plurality of frequency bands and further including additional energy distributed at frequencies intermediate said frequency bands,
equalizing said sampled signal in an equalizer,
recovering said symbols from the equalized sampled signal, and
repetitively updating the response of said equalizer.

23. The invention of claim 22 wherein said data signal has a percent rolloff $\beta$ and wherein $p > (1+\beta)$.

24. A method for processing a signal having a percent rolloff $\beta$ received over a band-limited transmission channel, said received signal representing a succession of data signal values occurring at T second intervals, said method comprising the steps of
forming a sampled signal comprised of a succession of samples occurring at a predetermined rate of p/T samples per second, $p > (1+\beta)$, said sampled signal including energy derived from said received signal distributed in a first plurality of frequency bands and further including additional energy distributed at frequencies intermediate said frequency bands,
forming during successive T second intervals respective equalizer outputs each equal to the sum of the products of a plurality of coefficients with a plurality of said samples,
forming in response to at least ones of the equalizer outputs (a) decisions as to respective ones of the data signal values and (b) corresponding error signals, and
updating the values of said coefficients in response to at least ones of said error signals.

25. The invention of claims 22, 23 or 24 wherein said additional energy is comprised of a plurality of sinusoids, each having a selected frequency.

26. The invention of claims 22, 23 or 24 wherein said additional energy is comprised of at least one sinusoid, the frequency of which is varied in a predetermined manner.

27. The invention of claims 22, 23 or 24 wherein said additional energy is comprised of noise energy.

28. The invention of claim 24 wherein said updating step is comprised of the step of updating the values of said coefficients in such a way as to minimize the average of the value of the squares of said ones of said error signals.

29. A method for use in a receiver which receives a passband signal transmitted to said receiver with a percent rolloff $\beta$ over a band-limited transmission channel, said received passband signal representing a succession of data symbols occurring at T second intervals, said method comprising the steps of
forming a sampled signal comprised of a succession of samples occurring at a predetermined rate of p/T samples per second, $p > (1+\beta)$, said sampled signal including energy derived from said received passband signal distributed in a first plurality of frequency bands and further including additional energy distributed at frequencies intermediate said frequency bands, and
forming during each one of a succession of T second intervals a decision as to the value of an individual one of said symbols, said decision forming step comprising the steps of
multiplying at least individual ones of a predetermined number of the most recently formed ones of said samples with individual ones of a plurality of coefficients, each coefficient having a predetermined value associated with said one of said intervals,
demodulating the sum of the resulting products to form a baseband output,
forming said decision and a passband error signal in response to said baseband output, said passband error signal being equal to the difference between said sum and a remodulated version of said decision, and
determining in response to said passband error signal the value of said each coefficient associated with a subsequent one of said intervals.

30. The invention of claim 29 wherein said sampled signal forming step is comprised of the steps of
combining with said received passband signal a signal having energy within the range $(0-2\pi p/T)$ rad/sec at frequencies at which the transfer function of said transmission channel has substantially zero gain and
sampling the output of said combining means at said predetermined rate.

31. The invention of claim 30 wherein said received passband signal has a radian carrier frequency $\omega_c$ and wherein $\beta = (\omega_{co}T/\pi - 1)$, $(\omega_c + \omega_{co})$ being the highest frequency at which the transfer function of said transmission channel has said substantially zero gain.

32. The invention of claims 29, 30 or 31 wherein said additional energy is comprised of a plurality of sinusoids each having a selected frequency.

33. The invention of claims 29, 30 or 31 wherein said additional energy is comprised of at least one sinusoid, the frequency of which is varied in a predetermined manner.

34. The invention of claims 29, 30 or 31 wherein said additional energy is comprised of random noise energy.

35. The invention of claim 31 wherein said determining step includes the step of combining an updating term with the value of said each coefficient associated with said one of said intervals, the magnitude of said updating term being equal to a predetermined fraction of the product of a passband error signal formed during a predetermined one of said intervals with the sample with which said one coefficient was multiplied during said predetermined one of said intervals.

36. A method for use in an arrangement for processing a received data signal transmitted to said arrangement over a band-limited transmission channel at 1/T data signal values per second, said received signal having a percent rolloff $\beta$, said method comprising the steps of combining a second signal with said received signal to generate a combined signal, forming a sampled signal at a rate of p/T samples per second in response to said combined signal, $p > (1+\beta)$, said second signal having energy within the range (0–2$\pi$p/T) rad/sec at frequencies at which the transfer function of said transmission channel has substantially zero gain, equalizing said sampled signal in an equalizer, forming decisions as to said data signal values in response to the equalized sampled signal, and periodically updating the response of said equalizer.

37. A method for use in an arrangement for processing a received data signal transmitted with a percent rolloff $\beta$ to said arrangement over a band-limited transmission channel at 1/T data signal values per second, said method comprising the steps of combining a second signal with said received signal to generate a combined signal, forming samples of said combined signal at a rate of p/T samples per second, $p > (1+\beta)$, said second signal having energy within the range (0–2$\pi$p/T) rad/sec at frequencies at which the transfer function of said transmission channel has substantially zero gain, forming during successive T second intervals respective equalizer outputs each equal to the sum of the products of a plurality of coefficients with respective ones of a plurality of said samples, forming in response to at least ones of the equalizer outputs (a) decisions as to the values of respective ones of the transmitted data signal values and (b) corresponding error signals, and updating the values of said coefficients in response to at least ones of said error signals.

38. The invention of claims 36 or 37 wherein said second signal is comprised of a plurality of sinusoids, each having a selected frequency.

39. The invention of claims 36 or 37 wherein said second signal is comprised of at least one sinusoid, the frequency of which is varied in a predetermined manner.

40. The invention of claims 36 or 37 wherein said second signal is a noise signal.

41. The invention of claims 36 or 37 wherein said data signal is a passband signal having a radian carrier frequency $\omega_c$ and wherein the highest frequency at which the transfer function of said transmission channel has substantially non-zero gain is $(\omega_c + (1+\beta)\pi/T)$.

42. The invention of claim 37 wherein said updating step is comprised of the step of updating each of said coefficients in such a way as to minimize the average of the value of the squares of said error signals.

* * * * *